(12) United States Patent
Greyling

(10) Patent No.: US 8,159,181 B2
(45) Date of Patent: Apr. 17, 2012

(54) COMBINING TWO OR MORE DC TO DC CONVERTERS TO LIMIT EXTERNAL COILS

(75) Inventor: Abraham Carl Greyling, Villach (AT)

(73) Assignee: Infineon Technologies AG, Neubiberg (DE)

( * ) Notice: Subject to any disclaimer, the term of this patent is extended or adjusted under 35 U.S.C. 154(b) by 555 days.

(21) Appl. No.: 12/366,497

(22) Filed: Feb. 5, 2009

(65) Prior Publication Data

US 2010/0194344 A1    Aug. 5, 2010

(51) Int. Cl.
*H02J 7/00* (2006.01)

(52) U.S. Cl. .......................... 320/107; 323/240; 323/224

(58) Field of Classification Search .................. 320/104, 320/105, 107, 114, 135, 140, 137, 138; 323/222, 323/282–290, 232, 259, 301; 363/16–20, 363/41, 97, 98, 131
See application file for complete search history.

(56) References Cited

U.S. PATENT DOCUMENTS

| | | | |
|---|---|---|---|
| 5,373,195 A | 12/1994 | De Doncker et al. | |
| 5,734,258 A | 3/1998 | Esser | |
| 6,031,743 A * | 2/2000 | Carpenter et al. | 363/65 |
| 6,222,352 B1 * | 4/2001 | Lenk | 323/267 |
| 6,268,666 B1 | 7/2001 | Bhowmik | |
| 7,154,250 B2 * | 12/2006 | Vinciarelli | 323/240 |
| 7,378,823 B2 * | 5/2008 | Yamanaka et al. | 323/267 |
| 7,486,046 B2 * | 2/2009 | Chou | 320/107 |
| 7,684,222 B2 * | 3/2010 | Paatero | 363/132 |
| 7,808,217 B2 * | 10/2010 | de Cremoux et al. | 323/222 |
| 2004/0207378 A1 | 10/2004 | Bucur et al. | |
| 2007/0112443 A1 | 5/2007 | Latham et al. | |
| 2007/0216319 A1 | 9/2007 | Wai et al. | |
| 2007/0229028 A1 | 10/2007 | Hashimoto | |

FOREIGN PATENT DOCUMENTS

JP    2002064972    2/2002

* cited by examiner

*Primary Examiner* — Rajnikant Patel
(74) *Attorney, Agent, or Firm* — Lee & Hayes, PLLC

(57) ABSTRACT

This disclosure relates to a voltage converter including a control circuit, a converter sub-circuit, and a single coil, where when the voltage converter can perform bi-directional voltage conversion using the single coil. In other words, the voltage converter can generate one or more regulated output voltages in both directions from one or more input voltages using the same coil.

19 Claims, 8 Drawing Sheets

COMBINING TWO OR MORE DC TO DC CONVERTERS TO LIMIT EXTERNAL COILS

BACKGROUND

As electronic portable devices continue to evolve in technical complexity, so do the power requirements of such devices. For example, electronic portable devices, such as digital cameras or mobile phones, may at times be powered using a charger, and at other times using a battery. Furthermore, while charging, the electronic portable device may be powered in addition to charging its battery. While powered using a battery, the electronic portable device may need to supply power to another device in addition to being powered. Therefore, it is desirable to build smaller and more efficient power circuits that include voltage regulator circuits that would enable electronic portable devices to operate in a charging/discharging mode while limiting the use of any expensive components such as inductors and/or control circuits.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

Figure 1A:
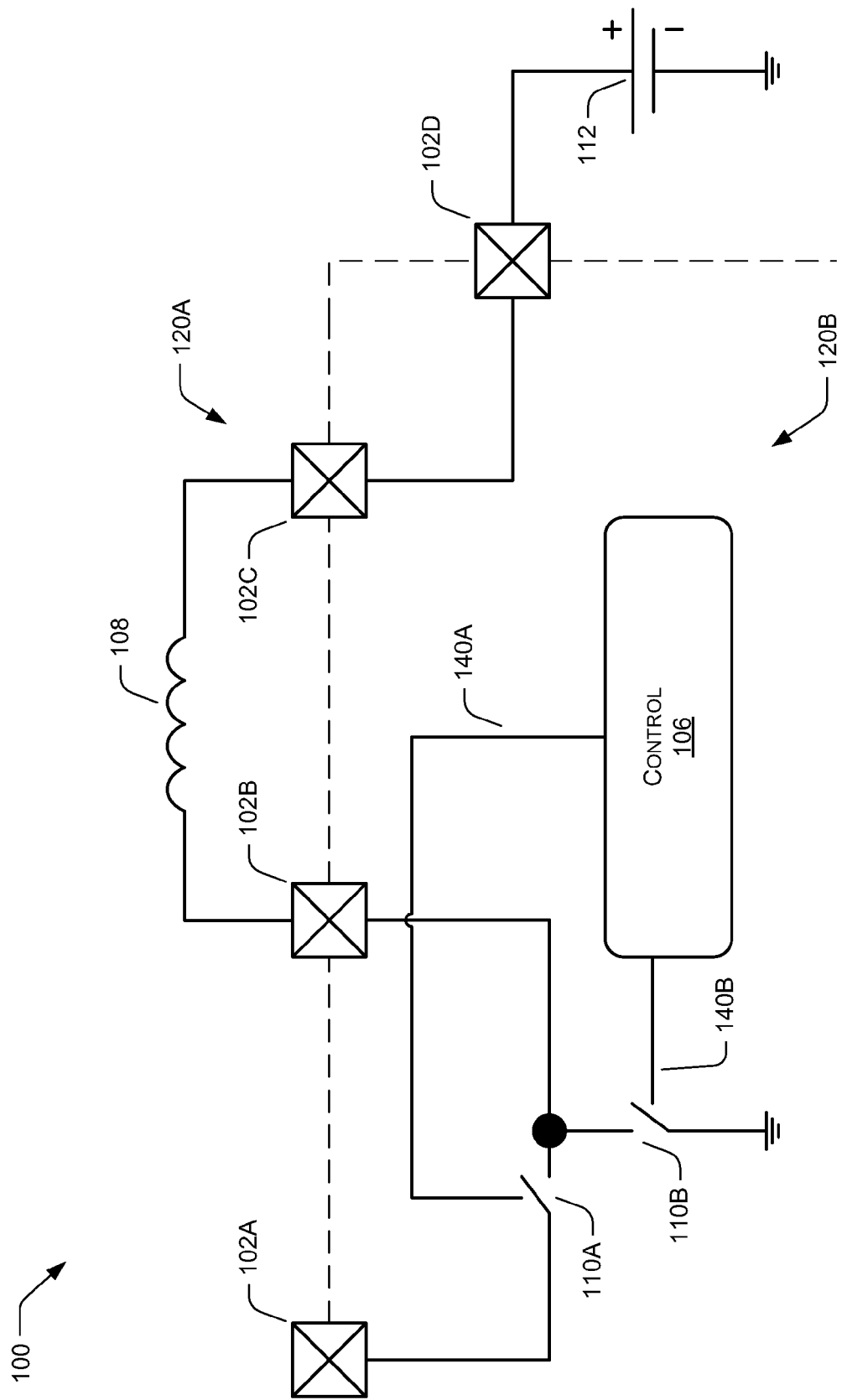
FIGS. 1A and 1B are exemplary block diagrams for a DCDC Buck and Buck-Boost converters, respectively.

While the invention may be modified, specific embodiments are shown and explained by way of example in the drawings. The drawings and detailed description are not intended to limit the invention to the particular form disclosed, and instead the intent is to cover all modifications, equivalents, and alternatives falling within the spirit and scope of the present invention as defined by the claims.

DETAILED DESCRIPTION

Disclosed herein are techniques for a voltage regulator having one or more outputs that may operate bi-directionally and may contain a single coil and a converter sub-circuit with a minimum number of circuit elements. In one described implementation, where a voltage converter is considered, the voltage converter may be coupled to a charge input/connection, a battery input/connection, and one or more load outputs. The voltage converter may include a control circuit that may place the converter sub-circuit in one of two directional modes (e.g., a charging mode and a discharging mode). When operating in the first directional mode, the voltage converter may receive a charge voltage on the charge input and generate regulated voltages on a battery input and on the one or more load outputs. When operating in the second directional mode, the voltage converter may use a battery voltage from the battery input and generate regulated voltages on the charge input and/or on the one or more load outputs.

The voltage converter described herein is not limited to the charging and discharging operations. Instead, the voltage converter can perform bi-directional voltage conversion using a single coil. In other words, the voltage converter can generate one or more regulated output voltages in both directions from one or more input voltages using the same coil.

The techniques described herein may be implemented in a number of ways. One example environment and context is provided below with reference to the included figures and on-going discussion.

Overview

A voltage converter is implemented that uses one external coil to operate as a bi-directional DC (direct current) to DC converter that can generate one or more regulated voltages. For example, the voltage converter can charge a battery and provide one or more load voltages, as well use another voltage (e.g., from the battery) for powering a device on the charging input and providing one or more load voltages. The voltage converter may use a minimum number of circuit elements. For example, the voltage converter may combine two separate dc-dc voltage converters, a first voltage converter for providing a regulated voltage for charging a battery and a second voltage converter for providing a regulated voltage from discharging the battery (e.g., to a device connected to a charge input). In addition, the voltage converter may be able to provide dual output capability for both modes, i.e., provide one or more regulated voltages to one or more loads (e.g., powering a mobile electronic device) in addition to charging/discharging a battery.

Figure 2A:
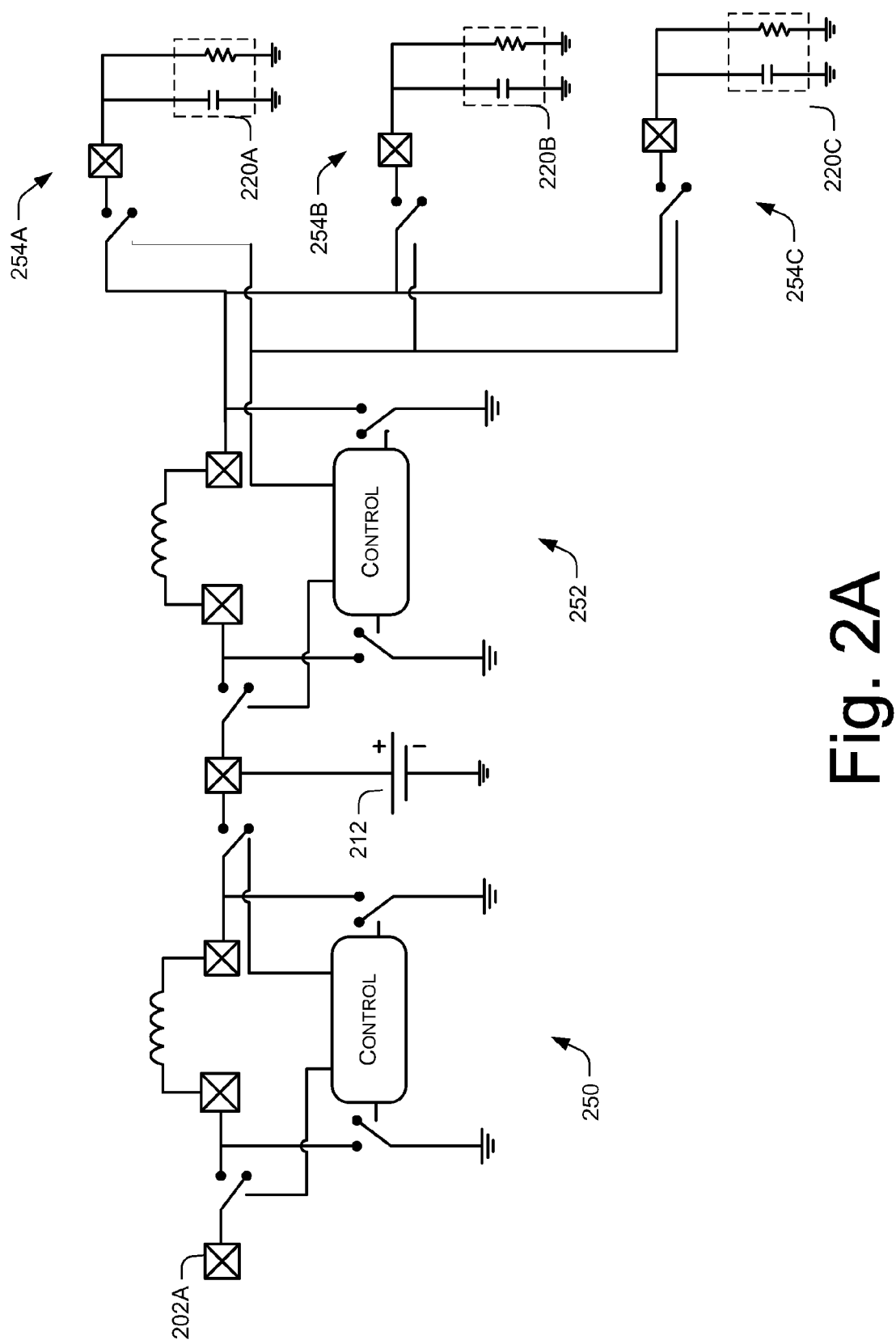
FIGS. 2A and 2B are exemplary block diagrams for a dual charging and discharging DCDC converters.
Figure 2B:
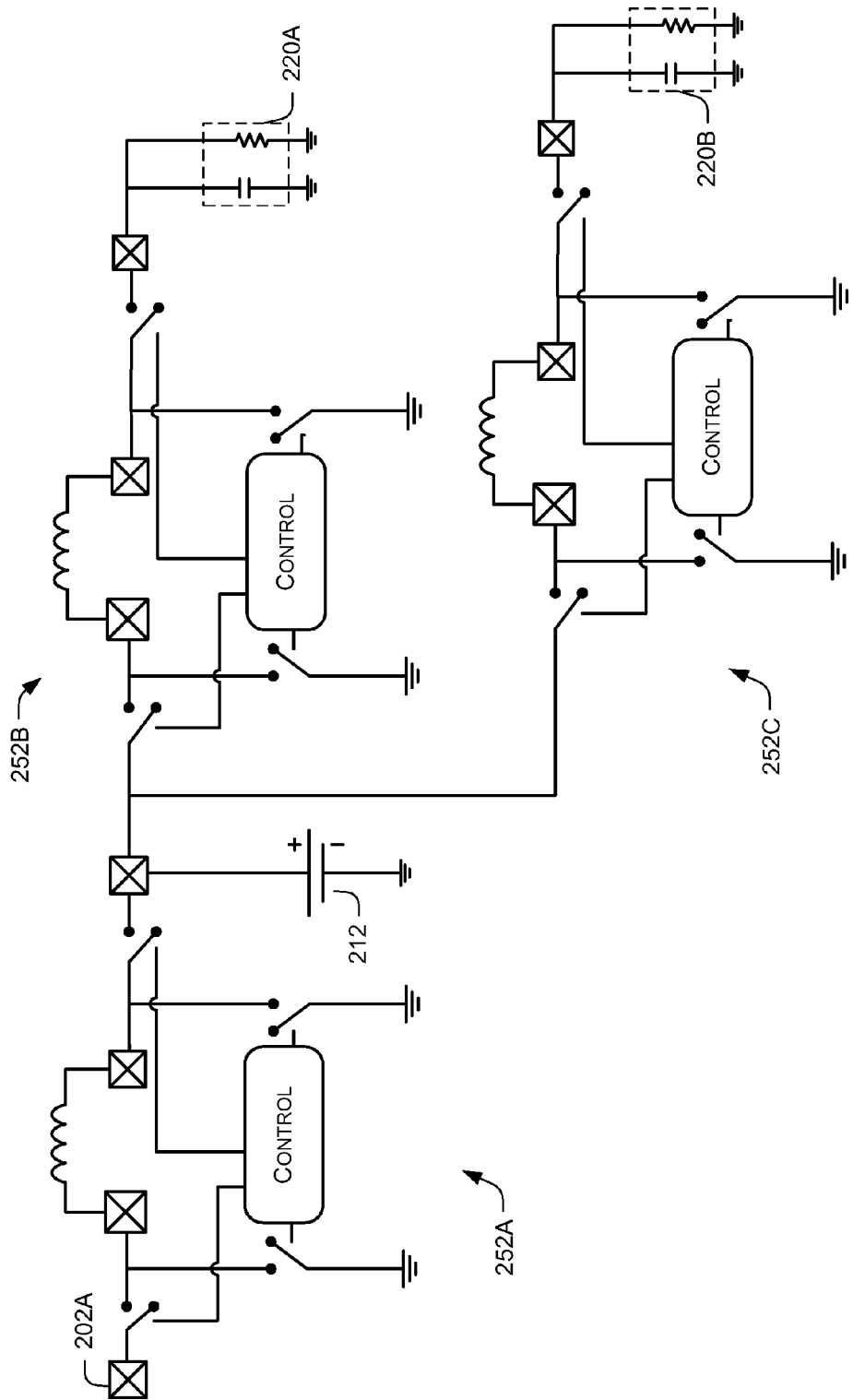

The voltage converter may thus optimize the number of circuit elements and may include a single control circuit, a single coil, and a plurality of switches. The single coil, such as an inductor, may be external to the converter sub-circuit (e.g., if the converter sub-circuit is a part of an integrated circuit, IC). Thus, the voltage converter may use a single control circuit, a single coil, and a converter sub-circuit with a minimum number of switches for voltage regulation. In contrast, as shown in FIGS. 2A-2B, if a separate buck, boost, or buck-boost voltage converter (e.g., for the charging operation) and a separate buck, boost, or buck-boost voltage converter were used, the voltage converter would need at least two coils, two controls, and more switches (i.e., as utilized by each dc-dc converter).

When operating in the charging mode, the voltage converter can receive a charge voltage on a charge input and generate a regulated voltage on a battery input and on the one or more load outputs. When operating in the discharging mode, the voltage converter can use a battery voltage from the battery input and generate regulated voltages on the charge input and on the one or more load outputs. As described herein, the charging and discharging modes are just exemplary bi-directional uses of the voltage converter.

Exemplary System

FIG. 1A illustrates an exemplary DC-DC buck voltage converter 100 (referred to herein as a buck voltage converter) for using a source (or charge) voltage received on terminal 102A and providing a regulated output voltage on terminal 102D to a storage element, such as a battery 112. The buck voltage converter 100 may be implemented as part of various electronic devices, including portable electronic devices, such as digital music players, mobile phones, and/or digital cameras, among others. The buck voltage converter 100 may be included as a part of an IC 120B, and the coil may be external 120A to the IC 120B. However, the coil may be also be internal to the IC 120B. The buck voltage converter 100 may also be comprised of discrete components.

The buck voltage converter 100 may convert an input voltage to an output voltage. In this example, the buck voltage converter 100 may receive an input voltage from a charge device on the charge terminal 102A. The buck voltage converter 100 may use a feedback system (not shown) that is able to sense the levels of the input/output voltages.

In certain embodiments, the buck voltage converter 100 may be placed on an integrated chip (IC), and may use an external coil (e.g., an inductor) 108, connected using terminals 102B and 102C. The buck voltage converter 100 may include two switches 110A and 110B, that along with the coil 108, may generate a regulated voltage across the battery 112. The buck voltage converter 100 may use the two switches 110A and 110B to open and close with a duty cycle, which may be controlled by a controller 106 using a control signal (also referred to as a lead) 140A for the first switch 110A and the lead 140B for the second switch 110B. Thus, in an exemplary buck operation, the first switch 110A may be closed in order to build-up magnetic flux in the coil 108. When the first switch 110A is open and the second switch 110B is closed, energy (i.e., voltage) may be delivered across the battery 112.

Figure 1B:
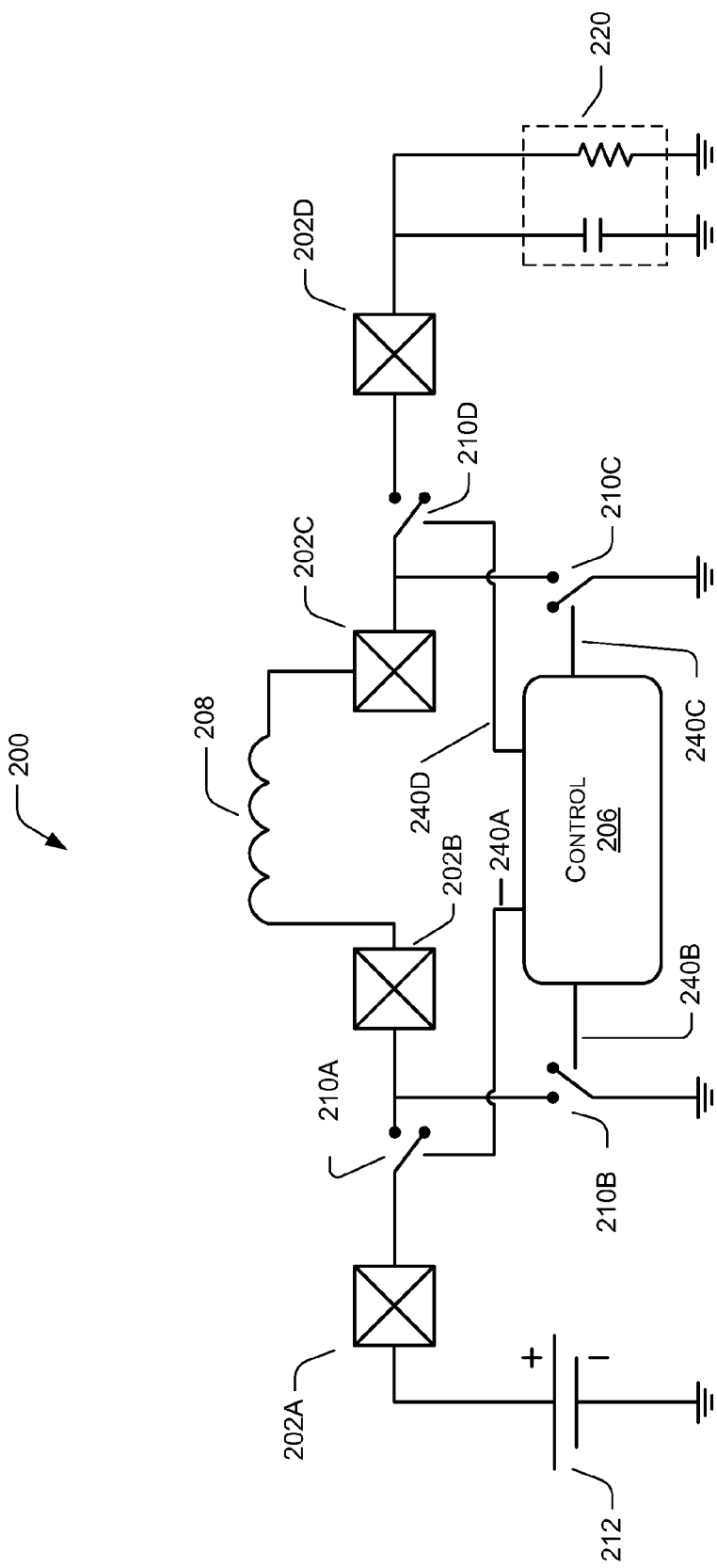

The buck voltage converter 100 of FIG. 1A may be able to receive a charge input voltage at the charge input terminal (e.g., a pad) 102A. The buck voltage converter 100 may convert the charge input voltage to a different output voltage using the switches 110A-B and the coil 108 as described above. This output voltage may be applied to a battery at the battery output terminal 102D, such as in order to charge/recharge the battery 112. In FIG. 1B an exemplary opposite process is described, i.e., how a stored charge/voltage on the battery 112 may be applied to device, such as to a mobile phone or a power management unit.

FIG. 1B illustrates an exemplary dc-dc buck-boost voltage converter 200 (referred to herein as a buck-boost voltage converter) for using a stored battery voltage from a battery 212 received on a terminal 202A and providing a regulated output voltage across a terminal 202D to one or more load elements 220. The buck-boost voltage converter 200 may be implemented as part of various electronic devices, including portable electronic devices, such as digital music players, mobile phones, and/or digital cameras, among others. The buck-boost voltage converter 200 may be included as a part of an IC 220B, and a coil 208 may be external to the IC. The buck-boost voltage converter 200 may convert an input voltage to an output voltage. In this example, the buck-boost voltage converter 200 may receive an input voltage from a battery 212. The buck-boost voltage converter 200 may use a feedback system (not shown) that is able to sense the levels of the input/output voltages and/or currents.

In certain embodiments, the buck-boost voltage converter 200 may be placed on an integrated chip (IC), and it may use the external coil (e.g., an inductor) 208, such as connected using terminals 202B and 202C. The buck-boost voltage converter 200 may include four switches 210A-D that, along with the coil 208, may generate one or more regulated voltages across the loads 220. The buck-boost voltage converter 200 may use the four switches 210A-D to open and close with a duty cycle, which may be controlled by a controller 206 using leads 240A-D for the four switches 210A-D respectively.

For example, in an exemplary buck-boost operation, when both the first switch 210A and the third switch 210C are closed, magnetic flux may build up in the inductor 208. When both the second switch 210B and the fourth switch 210D are closed, energy (i.e., voltage) may be delivered to the one or more loads 220. In this exemplary buck-boost operation, the first and third switches 210A and 210C, as well as the second and fourth switches 210B and 210D may be used in combination. In certain embodiments, other implementations involving four switches (or more or less switches depending on the implementation) may be used to accomplish a buck, boost, or a buck-boost function (e.g., input voltage higher or lower than output voltage) by combining the different switches in different ways and with different duty cycles than in the above exemplary buck-boost operation.

The buck-boost voltage converter 200 may be used to provide a constant (i.e., a regulated) voltage from a battery. The buck-boost voltage converter 200 may be particularly useful when a load, e.g., the one or more loads 220, and/or capacity of the battery 212 changes over time. The buck-boost voltage converter 200 may be able to convert the battery 212 voltage to a different regulated output voltage using the switches 202A-D and the coil 208 as described above. This regulated voltage may be applied to the one or more loads 220.

In many devices, such as mobile phones or electric/hybrid cars, a combination of the above described operations may be needed. For example, a mobile device may first use a charger, or any other voltage source, to both supply power for its own operation (e.g., a load) and in order to charge a battery (e.g., a battery 112/212 of FIGS. 1A and 1B above). Thus two or more dc-dc voltage converters, such as the voltage converters of FIGS. 1A and 1B, may be combined. In certain embodiments, by combining the voltage converters of FIGS. 1A and 1B, several elements of these two designs may be eliminated, and thus saving cost, space, and/or power consumption, as well as possibly increasing response/speed of the design. FIGS. 2A and 2B illustrate two combinations of FIGS. 1A and 1B.

FIG. 2A illustrates a possible implementation of a combined DC-DC converter. A first buck, boost or buck-boost converter 250 may be used to charge a battery 212 from a charging input 202A. A second buck, boost or buck-boost converter 252 with more than one output stage 254A-C may be receive a stored voltage from the battery 212 and may generate a plurality of output voltages to supply more than one loads (or voltage domains) 220A-C.

FIG. 2B illustrates another possible implementation of a power supply distribution that uses two or more DC-DC converters. A first buck, boost or buck-boost converter 252A may be used to charge a battery 212 from a charging input 202A. Then, a second buck, boost or buck-boost converter 252B may be used to generate a regulated supply voltage from the battery 212, and may provide one or more regulated voltages to one or more loads 220A (e.g., other circuitry inside a mobile phone). The implementation of FIG. 2B may use one or more additional DC-DC converters (e.g., 252C) to supply regulated voltage to another set of one or more loads 220B.

In some embodiments, an electric/hybrid car may need to use a voltage converter for performing bi-directional voltage regulation. The voltage converter of FIGS. 3 and 4A/B may be used to perform bi-directional voltage conversion for one or more loads, where each load may require a different regulated voltage.

Figure 3:
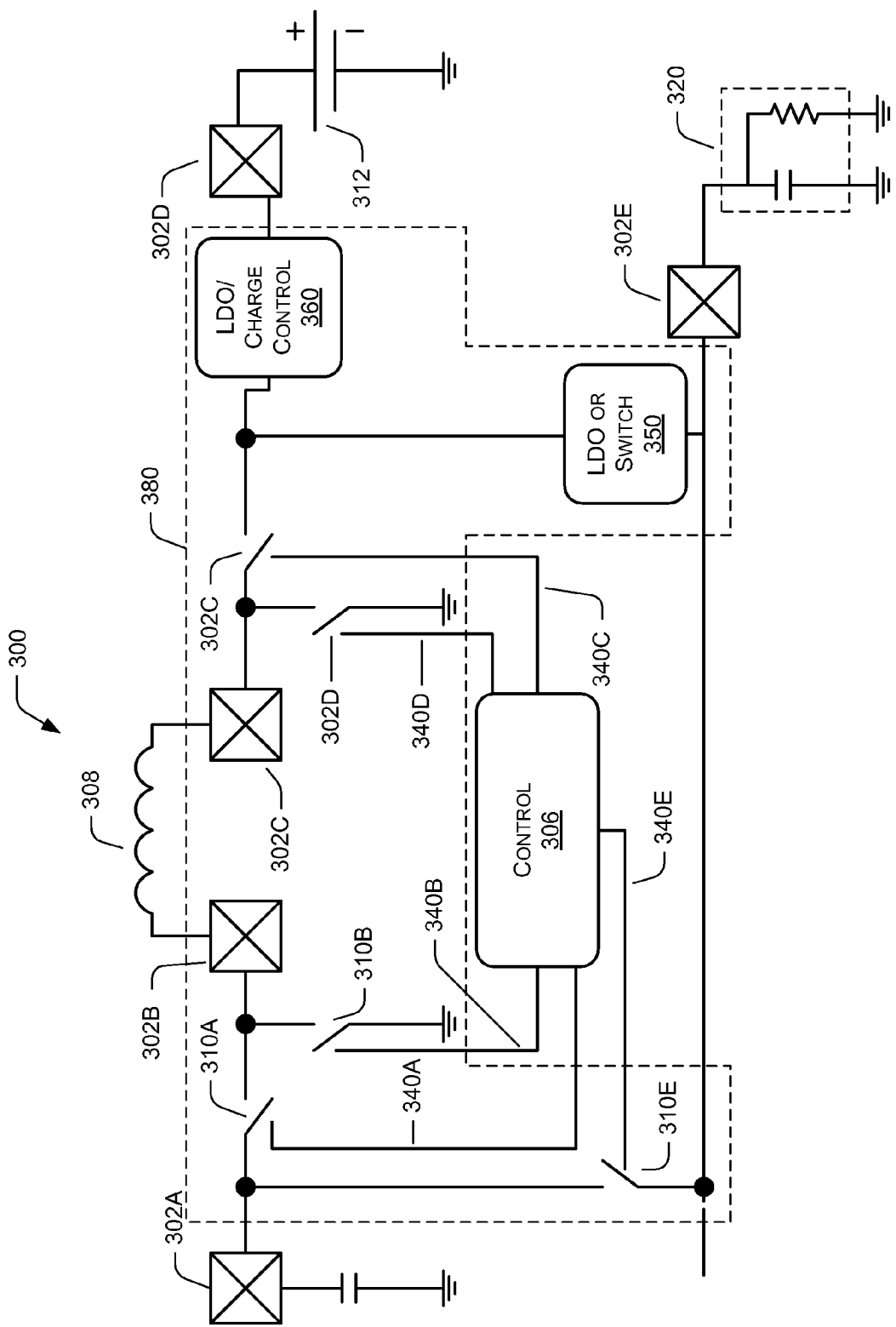
FIG. 3 is an exemplary block diagram of a DCDC voltage converter, according to some embodiments.

FIG. 3 illustrates an exemplary voltage converter 300 that may operate bi-directionally, e.g., in both charging mode and discharging modes. In a first direction (e.g., the charging mode), as described in more detail below, the voltage converter 300 may receive a first voltage (e.g., a charge voltage) and generate regulated voltages for a battery 312 and one or more load outputs 320. In a second direction, (e.g., the discharging mode), the voltage converter 300 receive a second voltage (e.g., a battery voltage from the battery 312) and generate regulated voltages for a device on the charge input 302A and for the one or more load outputs 320. The voltage converter 300 may also use a feedback system (not shown) that is able to sense the levels of the input/output voltages.

In certain embodiments, alternate and/or additional elements, such as switches, may be used in addition to, or instead of, the elements shown in FIG. 3. Furthermore, it is noted that in the following description the term "charging mode" is used to denote an exemplary operation of the voltage converter 300 in the first direction, and the term "discharging mode" is used to denote an exemplary operation of the voltage converter 300 in the second direction.

According to some embodiments, the voltage converter 300 uses one coil 308 and a converter sub-circuit 380 that includes a plurality of switches 310A-E. However, in certain embodiments, the fifth switch 310E may be connected between the terminals 302B and 302E. The voltage converter 300 may also include a control circuit 306 operable to place the converter sub-circuit 380 in one of the charging mode or the discharging mode, although other modes are contemplated (such as a hybrid charging/discharging mode where two batteries are connected to the voltage converter 300, and one battery is charging while another battery is discharging and powering at least a portion of the one or more loads 320). In certain embodiments, the voltage converter 300 may use one external coil 308 (e.g., an inductor) connected to the terminals 302B-C of the voltage converter 300 (such as when the voltage converter 300 is included on an IC and the coil 308 is external to the IC). However, in certain embodiments, the coil 308 may be internal to the IC.

In certain embodiments, in the charging mode, the voltage converter 300 may charge a battery 312 using a regulated voltage from a charger coupled to a charge terminal 302A. Specifically, when a charge voltage is applied to the charge terminal 302A, the converter sub-circuit 380 (e.g., the four switches 310A-D) in conjunction with the coil 308 (and any other elements for the DC-DC conversion) may operate as a DC-DC converter and provide regulated output voltages (also referred to herein as "regulated voltages") to a battery 312 connected to the battery terminal 302D and to the one or more loads 320 connected to the load terminal(s) 302E. The voltage to the battery 312 may be additionally regulated or controlled by another voltage regulator or a Low Drop Out Regulator (LDO) (e.g., similar to the charge control LDO, in series with the converter sub-circuit 380).

The circuit controller 306 may control the operation of the converter sub-circuit 380, e.g., the four switches 310A-D used for the dc-dc conversion, as well as of a charge control 360 and/or an voltage regulator 350 (such as a low drop-out regulator LDO), and a fifth switch 310E that may be used to separate a charging operation from a discharging operation. During the charging operation, the fifth switch 310E may be opened for proper charging operation. Furthermore, during the charging operation, the voltage regulator 350 may be closed or operating to generate a voltage on the terminal 302E for the one or more loads 320. This voltage may be generated from the generated voltage which is generated by the converter sub-circuit 380, i.e., may be supplied to the Charge Control LDO 360 and/or to the LDO/switch 350. The LDO/switch 350 and the Charge Control LDO 360 may also be controlled by an external control circuit (not shown).

The value of the regulated output voltage to the battery 312 may be different from the value of the regulated output voltage to the one or more loads 320 (e.g., the regulated voltage to the battery 312 may be 9 volts and the regulated voltage to the one or more loads 320 may be 6 volts). In addition, the value of each regulated voltage to the each one of the loads 320 may be different, e.g., a first load may receive a regulated voltage of 5 volts and a second load may receive a regulated voltage of 15 volts. In certain embodiments, the charge control 360 may control the charging of the battery, such as controlling the level of the regulated voltage coming into the battery 312 (e.g., if the regulated voltage generated by the four switches 310A-D and the coil 308 is higher or lower than the voltage required by the battery 312). In certain embodiments, there may be multiple batteries 312 connected to one or more battery terminals 320D, and there may be multiple charge controls 360 for each of the one or more battery terminals 320D in order to control the voltage levels as needed by each of the multiple batteries 312.

Thus, in the charging mode, the converter sub-circuit 380 (e.g., the four switches 310A-D) may be controlled by the circuit control 306 in order to provide one or more regulated voltages on the battery terminal 302D as well as on the one or more load terminals 302E. For example, the four switches 310A-D may operate in one or more of a buck dc-dc converter operation or a buck-boost operation as described above with reference to FIG. 1A and FIG. 1B. While in the charging mode, the fifth switch 310E may be open (as controlled by the control circuit 406) for a proper charging operation. Furthermore, the regulated voltages may be switched to the one or more loads 320 by the voltage regulator 350 (i.e., by placing the voltage regulator 350 in an open position).

In certain embodiments, in the discharging mode, the voltage converter 300 may convert a second voltage (e.g., the stored voltage from a battery 312) to one or more regulated voltages that may be used to power a device connected to a charging terminal 302A. Thus during the discharging mode, the voltage converter 300 may operate in an reverse manner from the charging mode, meaning that the voltage (i.e., a current) may flow from the battery 312 to the charging terminal 302A (whereas during the charging mode the voltage (i.e., a current) may flow from the charging terminal 302A to the battery 312). In other words, the voltage flow across the coil 308 in the charging mode may be reverse from that in the discharging mode. In the discharging mode, the voltage flow may be provided to the one or more loads 320 via LDO or switch 350, or via the fifth switch 310E.

However, in both directions (e.g., when operating in both the charging and the discharging modes), the voltage (i.e., a current) may be provided to the one or more loads 320. As a result, the voltage converter 300 may be able to combine two or more traditional dc-dc converters and thus save redundant elements, such as extra coils, switches, control circuits, and/or terminals, among others.

Thus, in the discharging mode, the battery 312 may be used to supply power to the one or more loads 320 and/or any device(s) connected to the charging terminal 302A (which in this case would not be supplying any power). In certain embodiments, the charging terminal 302A and the first switch 310A may be duplicated in order to provide voltages to more than one device, e.g., when each of the multiple devices operates at a different voltage. It is understood that two or more batteries 312 may be used to supply power. Also, two or more devices may be connected to one or more charging terminals 302A as desired.

The converter sub-circuit 380 (e.g., the four switches 310A-D) may be controlled by the control circuit 306 in order to provide one or more regulated voltages on the charge terminal 302A as well as on the one or more load terminals 302E. For example, the converter sub-circuit 380 (e.g., the four switches 310A-D) may operate in one or more of a buck dc-dc converter operation or a buck-boost operation as described above with reference to FIG. 1A and FIG. 1B.

While in the discharging mode, the voltage regulator 350 may be open and the fifth switch 310E may be closed (as controlled by the control circuit 306) to connect the one or more regulated voltages (as generated by the four switches 310A-D and the coil 308) to the one or more loads 320.

The control circuit 306 may place the converter sub-circuit 380 in either one of the directional modes depending on what is connected to its terminals. For example, the control circuit 306 may place the converter sub-circuit 380 in the charging mode when a charging device is providing the charge voltage, such as on the charging terminal 302A. Furthermore, the control circuit 306 may place the converter sub-circuit 380 in the discharging mode when a battery 312 is providing the battery voltage, such as over the battery terminal 302D. However, other conditions for switching between the modes are contemplated, such as when more than two modes are used, and/or if there's a charging device connected to the voltage converter 300 but a user and/or the control circuit 306 decide to use the battery instead (e.g., use the discharging mode). Similarly, if there's a fully charged battery connected to the voltage converter 300, but the user and/or the control circuit 306 decides to use a charge from the charge from the charging terminal instead (e.g., use the charging mode).

Figure 4A:
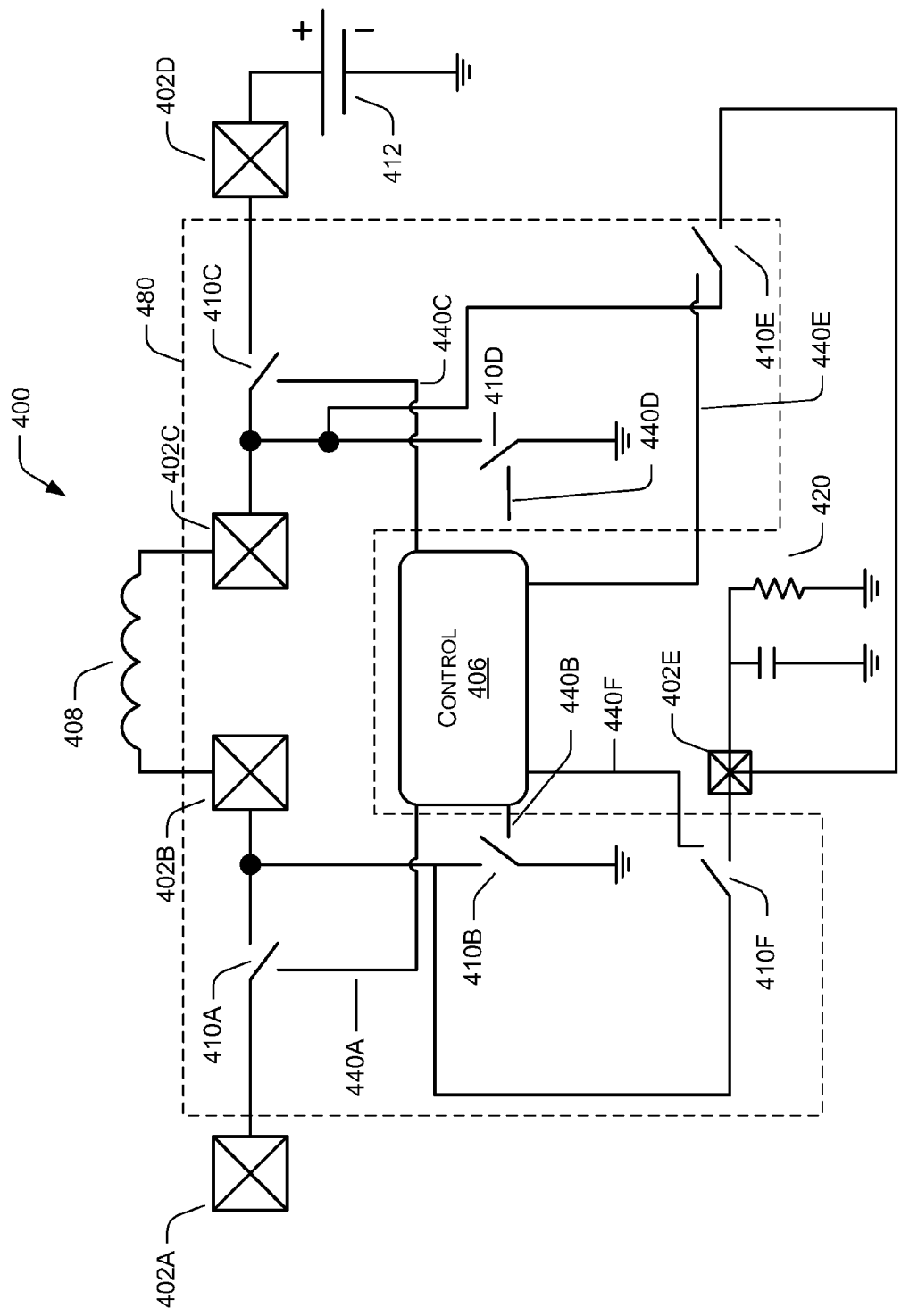
FIGS. 4A and 4B are additional exemplary block diagrams of a DCDC voltage converter, according to some embodiments.
Figure 4B:
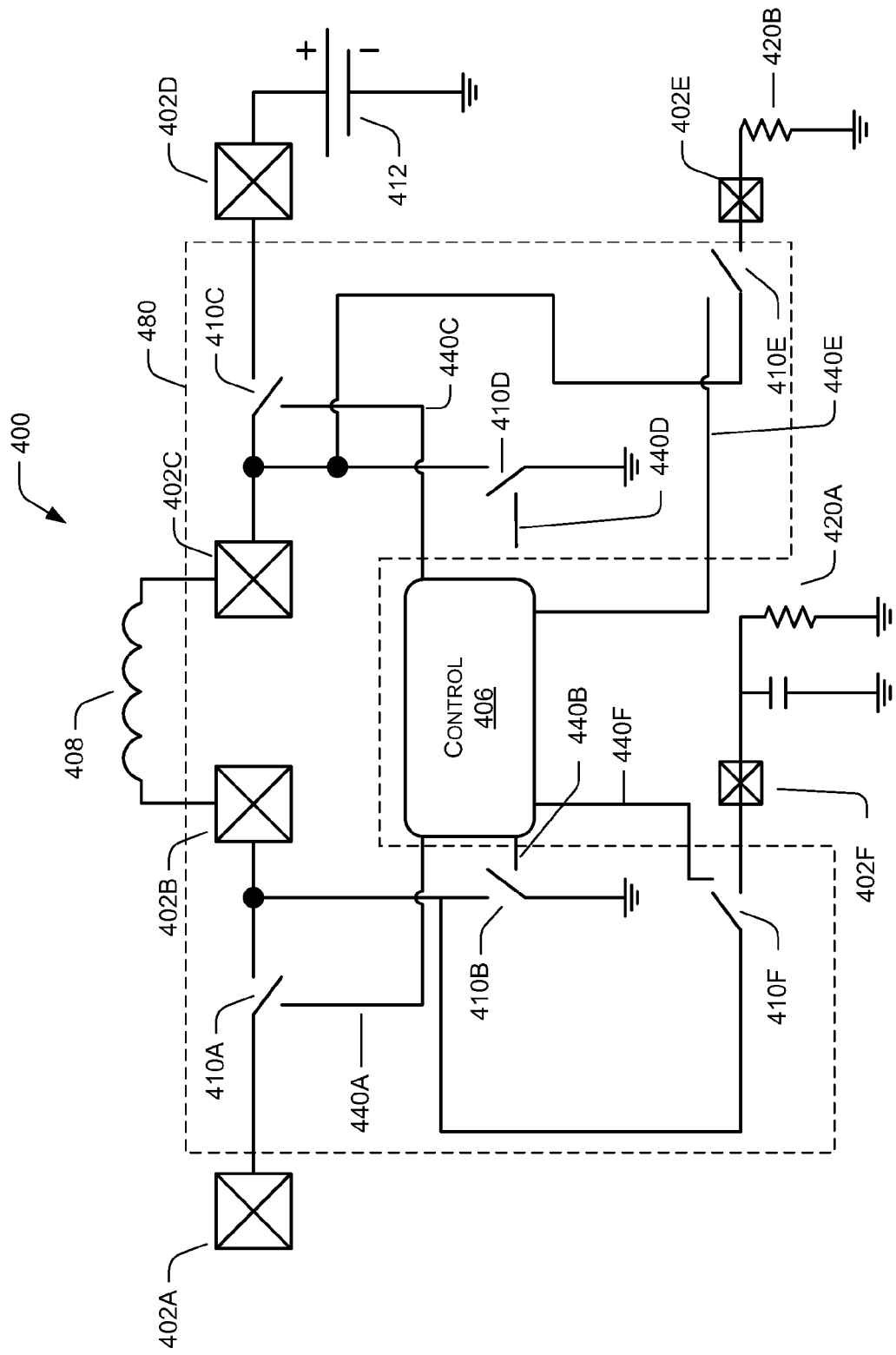

FIGS. 4A and 4B illustrate certain embodiments of a voltage converter that may be used instead of, or in combination with, a voltage converter of FIG. 3. In FIGS. 4A/B, a converter sub-circuit 480 (and thus the voltage converter 400) may also operate bi-directionally, e.g., in both charging mode and discharging modes. In a first direction (e.g., the charging mode), as described in more detail below, the voltage converter 400 may receive a charge voltage and generate regulated voltages for a battery 412 and one or more load outputs 420. It is noted that an output subsystem for the one or more load outputs may be duplicated for additional loads. In a second direction (e.g., the discharging mode), the voltage converter 400 may use battery voltage from the battery 412 and generate regulated voltages for a device on the charge input 402A and for the one or more load outputs 420. The voltage converter 400 may also use a feedback system (not shown) that is able to sense the levels of the input/output voltages.

According to some embodiments, the voltage converter 400 may only use one coil 408 and the converter sub-circuit 480 (including a plurality of switches 410A-F). The voltage converter 400 may also include a control circuit 406 operable to place the converter sub-circuit 480 in one of the charging mode or the discharging mode, although other modes are contemplated (such as a hybrid charging/discharging mode where two batteries are connected to the voltage converter 400, and one battery is charging while another battery is discharging and powering at least a portion of the one or more loads 420). In certain embodiments, the voltage converter 400 may use one external coil 408 (e.g., an inductor) connected to the terminals 402B-C of the voltage converter 400 (such as when the converter sub-circuit 480 is included on an IC and the coil 408 is external to the IC).

In certain embodiments, similarly to that described above with reference to FIGS. 4A/B, in the first direction (e.g., the charging mode), the voltage converter 400 may charge a battery 412 using a regulated voltage from a charger coupled to a charge terminal 402A. Specifically, when a charge voltage is applied to the charge terminal 402A, the converter sub-circuit 480 (e.g., four switches 410A-D) in conjunction with the coil 408 may operate as a dc-dc converter and provide regulated output voltages (also referred to herein as "regulated voltages") to a battery 412 connected to the battery terminal 402D and to the one or more loads 420 connected to the load terminal(s) 402E. The control circuit 406 may control the operation of the converter sub-circuit 480, including the four switches 410A-D used for the dc-dc conversion, and fifth and sixth switches 410E-F that may be used to generate a voltage on the load terminal 402E.

Specifically, while providing voltage in the first direction (e.g., while operating in the charging mode), the fifth switch 410E, in combination with the other switches, may be used as a part of a DC-DC converter (e.g., the converter sub-circuit 480) and controlled by the control circuit 406 to generate a voltage on the load terminal 402E. While providing voltage in the second direction (e.g., while operating in the discharging mode), the sixth switch 410F, in combination with the other switches, may be used as a part of a DC-DC converter (e.g., the converter sub-circuit 480) and controlled by the control circuit 406 to also generate a voltage on the load terminal 402E.

In certain embodiments, alternate and/or additional elements, such as switches, may be used in addition to, or instead of, the elements shown in FIGS. 4A/B. Furthermore, it is noted that in the following description the term "charging mode" is used to denote an exemplary operation of the voltage converter 400 in the first direction, and the term "discharging mode" is used to denote an exemplary operation of the voltage converter 400 in the second direction.

The value of the regulated output voltage to the battery 412 may be different from the value of the regulated output voltage to the one or more loads 420 (e.g., the regulated voltage to the battery 412 may be 9 volts and the regulated voltage to the one or more loads 420 may be 6 volts). In addition, the value of each regulated voltage to the each one of the loads 420/420A/420B may be different, e.g., a first load may receive a regulated voltage of 5 volts and a second load may receive a regulated voltage of 15 volts.

In certain embodiments, the circuit of FIGS. 4A/B may also include a charge control (not shown) for controlling the charging of the battery, such for controlling the level of the regulated voltage coming into the battery 412 (e.g., if the regulated voltage generated by the four switches 410A-D and the coil 408 is higher or lower than the voltage required by the battery 412). In certain embodiments, there may be multiple batteries 412 connected to one or more battery terminals 402D. For example, one or more of the switch 410D, the battery terminal 402D, and the battery 412 may be duplicated (not shown) to provide power to and from more than one battery.

Thus, while providing voltage in the first direction (e.g., while operating in the charging mode), the converter sub-circuit 480 (e.g., the six switches 410A-F) may be controlled by the control circuit 406 in order to provide one or more regulated voltages on the battery terminal 402D (and additional battery terminals as described above) as well as on the one or more load terminals 402E. For example, the converter sub-circuit 480 (e.g., the six switches 410A-F) may operate in one or more of a buck, boost, or buck-boost dc-dc converter operation as described above with reference to FIG. 1A and FIG. 1B. While providing voltage in the first direction (e.g., while operating in the charging mode), the fifth switch 410E may be used may be used as a part of a DC-DC converter (e.g., the converter sub-circuit 480) and controlled by the control circuit 406 to generate a voltage on the load terminal 402E.

Furthermore, the regulated voltages may be controlled to the one or more loads 420 by the switches 410A-F. Specifically, the voltage converter 400 of FIGS. 4A/B may be operable to perform dual mode dc-dc conversion, meaning that the charge input voltage received on the charge terminal 402A may be converted to a regulated voltage for the one or more loads 420. While providing voltage in the first direction (e.g., while operating in the charging mode), the dual mode DC-DC conversion may be performed by using the first 410A, second 410B, third 410C, fourth 410D, and fifth 410E switches. While providing voltage in the second direction (e.g., while operating in the discharging mode), the dual mode DC-DC conversion may be performed by using the first 410A, second 410B, third 410C, fourth 410D, and sixth 410F switches.

In certain embodiments, while providing voltage in the second direction (e.g., while operating in the discharging mode), the voltage converter 400 may convert a stored voltage from a battery 412 to one or more regulated voltages that may be used to power a device connected to a charging terminal 402A. Thus while providing voltage in the second direction (e.g., while operating in the discharging mode), the voltage converter 400 may operate in an reverse from its operation of the charging mode, meaning that the voltage (i.e., a current) may flow from the battery 412 to the charging terminal 402A (whereas during the charging mode the voltage (i.e., a current) may flow from the charging terminal 402A to the battery 412). In other words, the voltage flow across the coil 408 in the charging mode may be reverse from that in the discharging mode.

However, while operating in either the first or second directional mode (e.g., in both of the charging and the discharging mode) the voltage (i.e., a current) may flow to the one or more loads 420. As a result, the voltage converter 400 (and/or the voltage converter 300) may be able to combine two or more traditional dc-dc converters (e.g., a first voltage converter for the first direction (e.g., charging) and a second voltage converter for the second direction (e.g., discharging)) and thus save redundant elements, such as extra coils, switches, control circuits, and/or terminals, among others.

Thus, while providing voltage in the second direction (e.g., while operating in the discharging mode), a second voltage source (e.g., the battery 412) may be used to supply power to the one or more loads 420 and/or any device(s) connected to the charging terminal 402A (which in this case would not be supplying any power). It is understood that two or more batteries 412 may be used to supply power. Also, two or more devices may be connected to one or more charging terminals 402A as desired. Thus, the converter sub-circuit 480, including the six switches 410A-F, may be controlled by the control circuit 406 in order to provide one or more regulated voltages on the charge terminal 402A as well as on the one or more load terminals 402E. For example, the converter sub-circuit 480 (e.g., the four switches 410A-D) may operate in one or more of a buck dc-dc converter operation or a buck-boost operation as described above with reference to FIG. 1A and FIG. 1B.

While providing voltage in the second direction (e.g., while operating in the discharging mode), the fifth switch 410E may be open and the sixth switch 410F may be used (as controlled by the control circuit 406) along with the second 410B, third 410C, and fourth 410D switches to generate the one or more regulated voltages (along with the coil 408) for the one or more loads 420. The voltage converter 400 of FIGS. 4A/B may be operable to perform dual mode dc-dc conversion, meaning that the charge input voltage received on the charge terminal 402A may be converted to a regulated voltage for the one or more loads 420 as well as for any device(s) connected to the charge terminal(s) 402A.

In certain embodiments, as shown in FIG. 4B, the fifth and sixth switches 410E and 410F may be operable to provide the one or more regulated voltages to different loads 420A and 420B. Thus the fifth switch 410E may be operable to provide a regulated voltage to a first load 420A, whereas the sixth switch 410F may be operable to provide a regulated voltage to a second load 420B.

The control circuit 406 may place the converter sub-circuit 480 in either one of the directional modes depending on what is connected to its terminals. For example, the control circuit 406 may place the converter sub-circuit 480 in the charging mode when a charging device is providing the charge voltage, such as on the charging terminal 402A. Similarly, the control circuit 406 may place the converter sub-circuit 480 in the discharging mode when a battery 412 is providing the battery voltage, such as over the battery terminal 402D. However, other conditions for switching between the modes are contemplated, such as when more than two modes are used, and/or if there's a charging device connected to the voltage converter 400 but a user and/or the control circuit 406 decide to use the battery instead (e.g., use the discharging mode). Similarly, if there's a charged battery connected to the voltage converter 400, but the user and/or the control circuit 406 decides to use a charge from the charge from the charging terminal instead of using the battery (e.g., use the charging mode).

Thus, the converter sub-circuits 380 and 480 of FIG. 3 and FIGS. 4A/B (and thus the voltage converters 300 and 400 respectively) are both operable to operate in both directions (e.g., the charging and discharging modes), as well as with dual output mode capability. As mentioned above, the converter sub-circuits 380 and 480 of FIG. 3 and FIGS. 4A/B (and thus the voltage converters 300 and 400 respectively) are also operable to have multiple outputs (e.g., greater than just two).

The combination of the bi-directional modes (e.g., the charging and discharging modes) allows a voltage converter to charge a battery (e.g., battery 312/412 of FIGS. 3 and 4A/B respectively) using a charge voltage on a charge terminal (e.g., terminal 302A/402A of FIGS. 3 and 4A/B respectively) and then discharge the battery (e.g., battery 312/412 of FIGS. 3 and 4A/B respectively) while powering one or more loads (e.g., one or more loads 320/420 of FIGS. 3 and 4A/B respectively). The dual output mode capability for both the charging and discharging modes allows the voltage converter to either charge the battery (e.g., battery 312/412 of FIGS. 3 and 4A/B respectively) or to provide power to another device(s) (e.g., device(s) connected to the charge terminal(s) 302A/402A of FIGS. 3 and 4A/B respectively) while simultaneously powering the one or more loads (e.g., one or more loads 320/420 of FIGS. 3 and 4A/B respectively). As mentioned above, the voltage converters of FIG. 3 and FIGS. 4A/B both may eliminate one or more elements, including but not limited to, switches, coils, and/or control circuits, among others, as well as optimize physical space and power, as opposed to using a separate voltage converter for a charging operation and another separate voltage converter for a discharging operation.

In certain embodiments, the switch between the two directions (e.g., between the charging mode and the discharging mode) does not affect the level of the regulated voltages on the one or more loads (e.g., one or more loads 320/420 of FIGS. 3 and 4A/B respectively). Furthermore, there may be substantially no delay when switching from the first directional mode to the second directional mode. As a result, there may be substantially no effect on the one or more loads as a result of switching from using the first load voltages (provided using the first directional mode) to the second load voltages (provided using the second directional mode).

Exemplary Process

Figure 5:
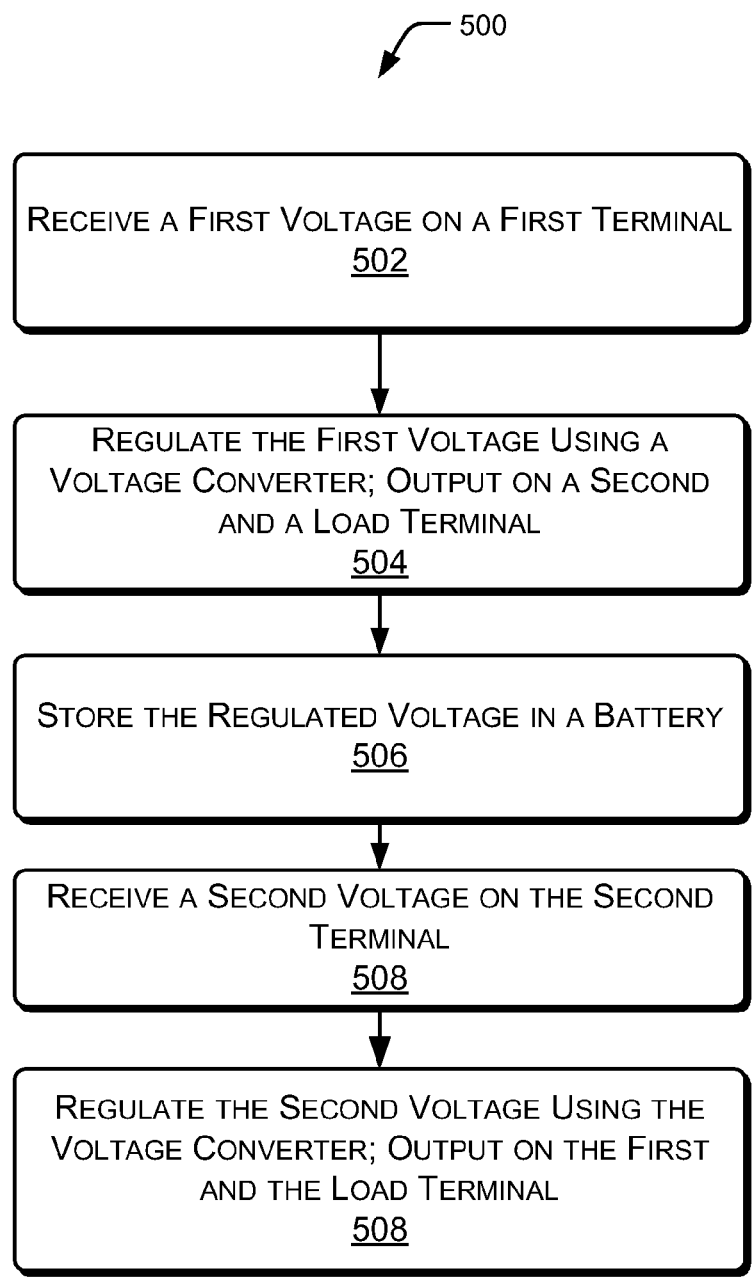
FIG. 5 is a flow diagram of a process for using a DCDC voltage converter, according to some embodiments.

FIG. 5 shows an exemplary flowchart of a method for operating a voltage converter (and thus a converter sub-circuit of a respective voltage converter) in both directions (e.g., the charging and discharging modes) with a dual output mode capability. Specifics of exemplary methods are described below. However, it should be understood that certain acts need not be performed in the order described, and may be modified, and/or may be omitted entirely, depending on the circumstances.

At 502, a voltage converter, such as the voltage converter 300 of FIG. 3 and/or the voltage converter 400 of FIGS. 4A/B, may receive a first voltage. For example, the voltage converter 300/400 may receive a charge voltage from a first terminal (e.g., a charge terminal 302A/402A) as described above.

At 504, the voltage converter 300/400 may regulate the first voltage. For example, the voltage converter 300/400 (e.g., a respective converter sub-circuit) may convert voltage in a first direction (e.g., operate in a charging mode) as described above in order to generate one or more regulated voltages on a second terminal (e.g., terminals 302D of FIG. 3 or terminal 402D of FIGS. 4A/B) and a load terminal (e.g., terminals 302D of FIG. 3 or terminal 402D of FIGS. 4A/B). Thus the voltage converter 300/400 may use a corresponding converter sub-circuit (such as the converter sub-circuit 380/480) including one or more switches (such as the switches 310A-E of FIG. 3 and/or switches 410A-F of FIGS. 4A/B), a coil (such as the coil 308 of FIG. 3 and/or coil 408 of FIGS. 4A/B), which may be controlled by a control device (such as the control circuit 306 of FIG. 3 and/or control circuit 406 of FIGS. 4A/B), to generate the one or more regulated voltages. As described above, there may be more than one load terminal depending on the configuration.

At 506, the voltage converter 300/400 may store the one or more regulated voltage(s) in a battery, such as a battery 312/412 of FIG. 3 and/or FIG. 4. The voltage converter 300/400 may store the regulated voltage in a battery 312/412, while at the same time providing one or more regulated voltages to one or more loads (such as the one or more loads 320 of FIG. 3 and/or one or more loads 420 of FIGS. 4A/B). As described above, this is referred to as a dual-output capability. It is noted that the storing of the one or more regulated voltages is optional, e.g., the one or more regulated voltages may be simply provided to other circuit elements.

At 508, the voltage converter 300/400 may receive a second voltage, such as a stored voltage from the battery 300/400, on the second terminal (e.g., the battery terminal 302D of FIG. 3 and/or battery terminal 402D of FIGS. 4A/B). Alternatively, the voltage converter 300/400 may receive a stored voltage from another battery that was previously charged (e.g., using a different voltage converter). However, the use of the voltage converter 300/400 is not limited to using a battery, which is an exemplary use only. Instead, the voltage converter 300/400 may simply receive a second voltage from a terminal previously (at block 506) used to provide as an output one or more regulated voltages. In other words, block 508 illustrates the bi-directional capability of the voltage converter 300/400.

At 510, the voltage converter 300/400 may regulate the stored voltage. For example, the voltage converter 300/400 may operate in a second direction, e.g., the discharging mode as described above in order to generate one or more regulated voltages on the first terminal and the load terminal. Thus the voltage converter 300/400 may use a corresponding converter sub-circuit (such as the converter sub-circuit 380/480) including the one or more switches (such as the switches 310A-E of FIG. 3 and/or switches 410A-F of FIGS. 4A/B), a coil (such as the coil 308 of FIG. 3 and/or coil 408 of FIGS. 4A/B), which may be controlled by a control device (such as the control circuit 306 of FIG. 3 and/or control circuit 406 of FIGS. 4A/B), to generate the one or more regulated voltages. As described above, the voltage converter 300/400 (e.g., a corresponding converter sub-circuit (such as the converter sub-circuit 380/480)) may operate in the discharging mode where the flow of voltage through the voltage converter 300/400 is substantially opposite to operating in the charging mode.

Next, the voltage converter 300/400 may provide the one or more regulated voltage(s) to both one or more loads (such as the one or more loads 320 of FIG. 3 and/or one or more loads 420 of FIGS. 4A/B), as well as any device(s) that may be connected to a charge terminal 302A/402A. As described above, this is referred to as a dual-output capability. Thus, as described above, there may be more than one load terminal used by the voltage converter, depending on the configuration.

CONCLUSION

For the purposes of this disclosure and the claims that follow, the terms "coupled" and "connected" have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. For example, the systems described could be configured as monitoring circuits and incorporated into various feedback and control loops. In addition, the voltage converter circuit may include other types of voltage converter circuits in various analog and digital configurations.

What is claimed is:

1. A voltage converter comprising:
   a coil;
   a converter sub-circuit that operates in a first directional mode and a second directional mode, the converter sub-circuit coupled to the coil, wherein when operating in the first directional mode, the converter sub-circuit receives a first voltage and uses the coil to generate first regulated voltages, and wherein when operating in the second directional mode, the converter sub-circuit receives a second voltage and uses the coil to generate second regulated voltages; and
   a control circuit that places the converter sub-circuit in one of the first directional mode and the second directional mode.

2. The voltage converter of claim 1, wherein the converter sub-circuit is coupled to one or more loads, wherein the first regulated voltages comprise first load voltages for the one or more loads, wherein the second regulated voltages comprise second load voltages for the one or more loads.

3. The voltage converter of claim 2, wherein voltage values of the first load voltages are substantially equal to voltage values of the second load voltages.

4. The voltage converter of claim 2, wherein there is substantially no delay between providing the first load voltages using the first directional mode and providing the second load voltages using the second directional mode.

5. The voltage converter of claim 1, wherein the control circuit senses one or more of the first voltage, the second voltage, the first regulated voltages, and the second regulated voltages.

6. The voltage converter of claim 1, wherein when operating in the first directional mode, the voltage converter charges a battery using one of the first regulated voltages; and wherein when operating in the second directional mode, the voltage converter receives the second voltage from the battery.

7. The voltage converter of claim 1, wherein when operating in the second directional mode, the voltage converter provides power to a device using one of the second regulated voltages.

8. The voltage converter of claim 1, wherein a voltage flow across the coil when operating in the first directional mode is reverse from a voltage flow across the coil when operating in the second directional mode.

9. The voltage converter of claim 1, wherein the control circuit places the converter sub-circuit in the first directional mode when a device provides the first voltage.

10. The voltage converter of claim 1, wherein the control circuit places the converter sub-circuit in the second directional mode when a device provides the second voltage.

11. A converter comprising:
a first voltage converter coupled to a coil, the first voltage converter to receive a source voltage and generate:
a first regulated voltage from the source voltage using the coil; and
a first additional regulated voltage, from the source voltage using the coil, on one or more load outputs; and
a second voltage converter coupled to the coil and to the first voltage converter, the second voltage converter to receive a second voltage and generate:
a second regulated voltage from the second voltage using the coil; and
a second additional regulated voltage, from the second voltage using the coil, on the one or more load outputs.

12. The converter of claim 11, wherein the first voltage converter and the second voltage converter share one or more switches in addition to the coil; and
wherein the first voltage converter and the second voltage converter use the one or more switches in addition to the coil to generate the first and the second regulated voltage, respectively.

13. The converter of claim 11, wherein the first voltage converter is coupled to a voltage storage device, wherein the first regulated voltage is to be received and stored by the voltage storage device as the second voltage, wherein the voltage storage device is to output the second voltage.

14. The converter of claim 11, further comprising:
a charge input coupled to the source voltage and to first voltage converter, the charge input is to transmit the first voltage.

15. The converter of claim 11, further comprising:
a control circuit coupled to both the first voltage converter and the second voltage converter, the control circuit to place the first voltage converter and the second voltage converter in one of a first directional mode and a second directional mode;
wherein when operating in the first directional mode, the first voltage converter receives the first voltage and generates the first regulated voltage; and
wherein when operating in the second directional mode, the second voltage converter receives the second voltage and generates the second regulated voltage.

16. The converter of claim 15, wherein a voltage flow across the coil when operating in the first directional mode is opposite from a voltage flow across the coil when operating in the second directional mode.

17. A method comprising:
receiving a first voltage on a first terminal;
regulating the first voltage using a first inductor to generate a first regulated voltage and a second regulated voltage on a second terminal and a load terminal, respectively;
receiving a second voltage on the second terminal; and
regulating the second voltage using the first inductor to generate a third regulated voltage and a fourth regulated voltage on the first terminal and on the load terminal, respectively.

18. The method of claim 17, further comprising:
storing the first regulated voltage by a battery as a stored voltage using the second terminal; and
wherein said receiving the second voltage comprises receiving the stored voltage from the battery using the second terminal.

19. The method of claim 17, wherein said regulating the first voltage comprises converting the first voltage with a first voltage value to the first regulated voltage with a second voltage value; and
wherein said regulating the first voltage further comprises converting the first voltage with the first voltage value to the second regulated voltage with a third voltage value.

* * * * *